(12) United States Patent
Brewbaker et al.

(10) Patent No.: US 10,330,034 B2
(45) Date of Patent: Jun. 25, 2019

(54) DEVICE AND METHOD FOR PREDICTING THE EXHAUST GAS RECIRCULATION RATE

(71) Applicant: Ford Global Technologies, LLC, Dearborn, MI (US)

(72) Inventors: Thomas Alan Brewbaker, Plymouth, MI (US); Christian Winge Vigild, Aldenhoven (DE); Daniel Roettger, Eynatten (BE); Michiel J. Van Nieuwstadt, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 44 days.

(21) Appl. No.: 15/495,403

(22) Filed: Apr. 24, 2017

(65) Prior Publication Data
US 2017/0314483 A1 Nov. 2, 2017

(30) Foreign Application Priority Data

Apr. 29, 2016 (DE) .................. 10 2016 207 358
Apr. 29, 2016 (DE) .................. 10 2016 207 360

(51) Int. Cl.
*F02D 41/00* (2006.01)
*F02M 26/46* (2016.01)
(Continued)

(52) U.S. Cl.
CPC ....... *F02D 41/0072* (2013.01); *F02D 41/144* (2013.01); *F02D 41/1448* (2013.01);
(Continued)

(58) Field of Classification Search
CPC ......... F02D 41/1456; F02D 2200/0402; F02D 21/08; F02D 41/144; F02D 41/32;
(Continued)

(56) References Cited

U.S. PATENT DOCUMENTS 4,142,493 A * 3/1979 Schira ................. F02D 41/0077
123/486
4,614,175 A 9/1986 Asayama
(Continued)

FOREIGN PATENT DOCUMENTS

DE 19628852 A1 1/1997
DE 102014214475 A1 2/2015
DE 102014216251 A1 2/2015

*Primary Examiner* — Patrick D Maines
*Assistant Examiner* — Edward Bushard
(74) *Attorney, Agent, or Firm* — Julia Voutyras; McCoy Russell LLP

(57) ABSTRACT

A device for predicting an exhaust gas recirculation rate of an internal combustion engine, which comprises an inlet system and at least one exhaust gas recirculation valve, is described. The device comprises a sensor arranged in the inlet system for determining the composition of the gas, a sensor for determining the position of the exhaust gas recirculation valve, and an evaluation apparatus. The evaluation apparatus is configured to determine and output a prediction of the exhaust gas recirculation rate based on a corrected estimate of the exhaust gas recirculation rate, wherein the estimate is based on the position of the exhaust gas recirculation valve and is corrected based on the composition of the gas as determined using the sensor.

19 Claims, 6 Drawing Sheets

(51) Int. Cl.
*F02M 35/10* (2006.01)
*F02M 26/06* (2016.01)
*F02M 35/024* (2006.01)
*F02D 41/14* (2006.01)
*F02D 41/18* (2006.01)

(52) U.S. Cl.
CPC ......... *F02D 41/1454* (2013.01); *F02D 41/18* (2013.01); *F02M 26/06* (2016.02); *F02M 26/46* (2016.02); *F02M 35/024* (2013.01); *F02M 35/1038* (2013.01); *F02M 35/10386* (2013.01); *F02D 2200/0406* (2013.01); *F02D 2200/0414* (2013.01); *F02D 2200/101* (2013.01); *Y02T 10/47* (2013.01)

(58) Field of Classification Search
CPC .. F02D 41/0072; F02D 41/1454; Y02T 10/47; F02M 26/47; F02M 26/48; F02M 26/06; F02M 26/23; F02M 35/10386; F02M 26/46; G01F 1/363; G01F 9/001
USPC ...................................................... 60/605.2
See application file for complete search history.

(56) References Cited

U.S. PATENT DOCUMENTS

| | | | |
|---|---|---|---|
| 5,520,161 A | 5/1996 | Klopp | |
| 6,035,639 A | 3/2000 | Kolmanovsky et al. | |
| 6,098,602 A | 8/2000 | Martin et al. | |
| 6,944,530 B2 | 9/2005 | Russell et al. | |
| 7,267,117 B2 * | 9/2007 | Tonetti | F02D 41/0072 123/568.11 |
| 8,775,011 B2 * | 7/2014 | Makki | F02D 41/1495 701/30.5 |
| 9,021,805 B2 | 5/2015 | Makki et al. | |
| 9,267,453 B2 | 2/2016 | Surnilla et al. | |
| 9,341,127 B2 | 5/2016 | Brewbaker et al. | |
| 9,726,091 B2 * | 8/2017 | Ruth | F02D 41/0065 |
| 9,964,055 B2 * | 5/2018 | Akagi | F02D 41/0062 |

* cited by examiner

DEVICE AND METHOD FOR PREDICTING THE EXHAUST GAS RECIRCULATION RATE

CROSS REFERENCE TO RELATED APPLICATION

The present application claims priority to German Patent Application No. 102016207358.3, filed on Apr. 29, 2016, and to German Patent Application No. 102016207360.5, filed on Apr. 29, 2016. The entire contents of each of the above-referenced applications are hereby incorporated by reference in their entirety for all purposes.

FIELD

The present disclosure relates to systems and methods for predicting an exhaust gas recirculation rate of an internal combustion engine and for determining or estimating the fresh air flow to the internal combustion engine.

BACKGROUND/SUMMARY

The current control of exhaust gas recirculation (EGR) during operation of an internal combustion engine, such as a diesel engine, of a vehicle relies on mass air flow (MAF) sensors in order to determine and regulate a quantity of recirculated exhaust gas. In this context, a flow of fresh air to the engine is regulated by setting a position of an EGR valve.

Documents DE 19628852 A1 and U.S. Pat. No. 5,520,161 describe a system for exhaust gas recirculation for a compression ignition engine and a method for controlling the exhaust gas recirculation in the compression ignition engine. In this context, a first pressure sensor is used for sensing an absolute gas pressure in an intake collecting line of the engine, a second pressure sensor is used for sensing an absolute gas pressure in an exhaust gas collecting line of the engine, and an engine rotational speed sensor, a fuel rate sensor, a temperature sensor in the intake collecting line, and further components are used for controlling a position of an exhaust gas recirculation valve.

Document U.S. Pat. No. 6,944,530 B2 discloses a system for exhaust gas recirculation, in which system exhaust gas from an exhaust gas manifold is conducted through a control valve and through a measuring nozzle before it reaches an inlet manifold. A pressure upstream of the nozzle and a correction pressure downstream of the nozzle are used to measure and control the exhaust gas flow.

Document U.S. Pat. No. 6,035,639 describes a method for estimating an inlet air flow into an internal combustion engine. Here, an amount of exhaust gas recirculation flow is determined as a function of an inlet manifold pressure, an outlet manifold pressure, a position of an exhaust gas recirculation valve, and a temperature of exhaust gas flowing through an exhaust gas recirculation system. The value of the inlet air flow is also used to control the position of the exhaust gas recirculation valve.

Document U.S. Pat. No. 6,098,602 describes an exhaust gas recirculation system for an internal combustion engine comprising an exhaust gas recirculation valve that is operated by a stepping motor. In particular, the control of the engine in order to achieve a desired exhaust gas recirculation mass flow rate is described.

However, the inventors herein have recognized potential issues with such systems. For example, the above mentioned systems and methods do not address effects such as MAF sensor drift, tolerances of components, and aging of the components, for example, which may influence a determination of an EGR flow rate. Therefore, with progressive aging of the vehicle, the efficiency of EGR control for reducing $NO_x$ emissions may be markedly reduced.

An advantage of the present disclosure is to make available a method and a device for predicting an exhaust gas recirculation rate of an internal combustion engine, wherein, in particular, aging processes and/or sensor differences are accounted for. In one example, the issues described above may be addressed by a system comprising an inlet system coupled to an internal combustion engine; an exhaust gas recirculation (EGR) valve coupled between an exhaust of the engine and the inlet system; and a device to predict an EGR rate based on a composition of gas in the inlet system and a position of the EGR valve. In this way, the exhaust gas recirculation rate may be accurately predicted without a MAF sensor.

As one example, the position of the EGR valve may be adjusted responsive to the predicted EGR rate differing from a desired EGR rate in order to achieve the desired EGR rate. Thus, the device for predicting the EGR rate may be used to generate feedback for accurate EGR control. As another example, the predicted EGR rate may be used to determine an EGR mass flow. Further still, the determined EGR mass flow may be used to determine a fresh air mass flow. Thus, the fresh air mass flow may be determined based on output of the device for predicting the EGR flow rate instead of using a dedicated air flow sensor, and degraded EGR control due to, for example, air flow sensor aging may be avoided.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
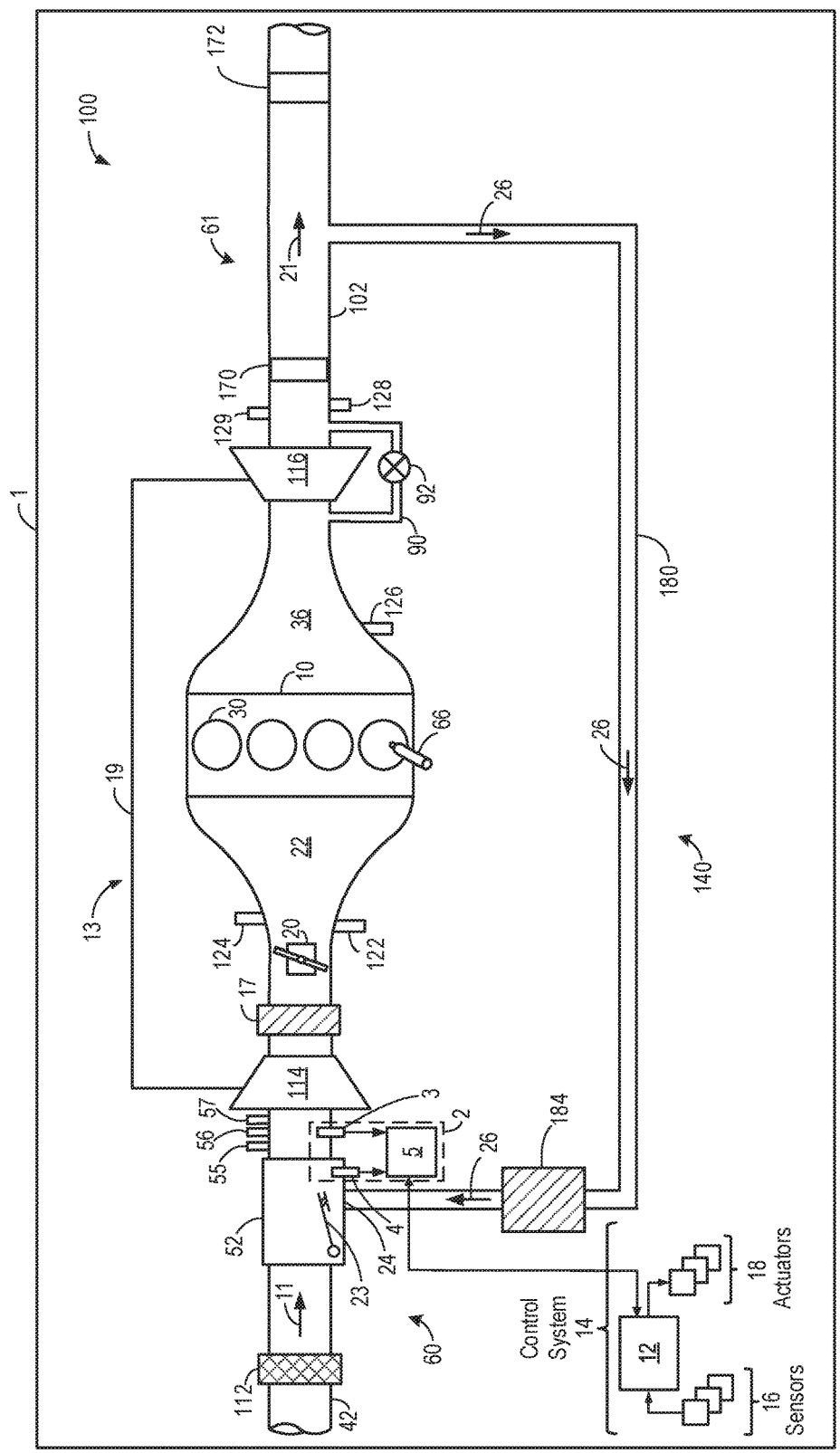
FIG. 1 is a schematic view of a motor vehicle, including an internal combustion engine with an exhaust gas recirculation (EGR) system and a device for predicting an EGR rate.

A device according to the present disclosure is provided for predicting an exhaust gas recirculation (EGR) rate of an internal combustion engine. The internal combustion engine may include an inlet system (e.g., an intake tract) and at least one EGR valve, such as the example engine system shown in FIG. 1. The device comprises a sensor arranged in the intake tract for determining (e.g., measuring) a composition of gas flowing through the intake tract and into the internal combustion engine. For example, the gas may include a mixture of fresh air and recirculated exhaust gas. The device additionally comprises an EGR position sensor for determining a position of the EGR valve (e.g., the valve setting) and an evaluation apparatus, for example, in the form of a dynamic observation apparatus. The EGR valve position sensor can be configured to measure the position of the exhaust gas recirculation valve. In this way, the actual valve position is available for further prediction or evaluation. For example, using the method of FIG. 2, the actual valve position may be used in combination with the composition of gas flowing through the intake tract to predict the EGR rate. The EGR rate may be further used to determine an EGR mass flow and a fresh air mass flow, as diagrammed in the signal processing schematics of FIGS. 3 and 4. Thus, the evaluation apparatus is configured to receive signals from the sensor of the device with information about the composition of the gas in the inlet system, receive signals from the EGR valve position sensor with information about the position or setting of the EGR valve, evaluate the received signals, and determine and output a value of the EGR rate. Furthermore, the evaluation apparatus can be configured to output feedback signals for regulating the position of the EGR valve, for example, according to the method of FIG. 5. In some examples, the EGR mass flow may be determined by a dynamic model that estimates intake mass flow, eliminating the need for a mass flow sensor, according to the method of FIG. 6.

The EGR rate can be precisely predicted due to the fact that the EGR rate, which is estimated based on the position of the EGR valve, is corrected based on the composition of the gas as determined using the sensor. The sensor for determining the composition of the gas can be, for example, an oxygen sensor configured as an FMan sensor arranged in the inlet tract, where FMan refers to a burnt mass fraction of combusted gas in the intake gases.

The evaluation apparatus can additionally be configured to predict an EGR mass flow and/or to predict the fresh air mass flow through an air filter arranged upstream of the EGR valve. For example, the predicted EGR rate can be multiplied by a charge air mass flow that enters the internal combustion engine through inlet valves. It is therefore possible to use a dynamically corrected prediction of the EGR rate in order to predict the EGR mass flow if the EGR rate is multiplied by the charge air mass flow.

The previously described device according to the present disclosure has an advantage that a flow of fresh air to the internal combustion engine can be determined and estimated or predicted based on the corrected (e.g., predicted) EGR rate without having to use a corresponding air flow sensor, such as a hot-film probe, a hot-film sensor, or a hot-wire probe. The present disclosure therefore makes available a method of regulating a portion of exhaust gas recirculated into the inlet without using an air flow sensor or air mass sensor.

The previously described device according to the present disclosure may be included in a motor vehicle. The motor vehicle is distinguished, in particular, by higher accuracy prediction of the EGR rate compared to air flow sensor-based methods, and, in turn, more accurate regulation of the EGR rate and reduced $NO_x$ emissions.

A method according to the present disclosure for predicting an EGR rate of an internal combustion engine, which comprises an inlet system or intake tract and at least one EGR valve, comprises determining a composition of gas in the inlet system of the internal combustion engine, determining a position of the EGR valve, estimating an EGR rate based on the determined position of the EGR valve, and predicting the EGR rate by correcting the estimate of the EGR rate based on the determined composition of the gas in the inlet system of the internal combustion engine. The described method can be carried out, in particular, using the previously described device according to the present disclosure. In another example, the method can be carried out by a vehicle controller communicatively coupled to the previously described device. In addition, the method has the same advantages as the previously described device according to the present disclosure.

The determination of the composition of the gas in the inlet system can be advantageously carried out with an oxygen sensor. In particular, the composition of the gas can be determined by measurement. Furthermore, the internal combustion engine can comprise an intake manifold, wherein the oxygen sensor is arranged in the intake manifold. The oxygen sensor can therefore be configured as an FMan sensor. The oxygen concentration or the oxygen content in the intake manifold can be determined (e.g., measured).

In a further variant, the EGR mass flow can be predicted on the basis of the EGR rate. This can be done, in particular, using the evaluation apparatus, wherein the predicted EGR rate is advantageously multiplied by a charge air mass flow that reaches the internal combustion engine through inlet valves. In this context, the charge air mass flow can be determined, for example, by measurement (e.g., using a mass air flow sensor).

In a further variant, a fresh air mass flow is predicted for an air filter arranged upstream of the exhaust gas recirculation valve. For this purpose, the predicted EGR rate can likewise be multiplied by the charge air mass flow which enters the internal combustion engine through the inlet valves.

Turning now to the figures, FIG. 1 schematically shows aspects of an example engine system 100, including an internal combustion engine 10, in a motor vehicle 1. In the depicted embodiment, engine 10 is a boosted engine coupled to a turbocharger 13, including a compressor 114 mechanically coupled to a turbine 116 via a shaft 19, with turbine 116 driven by expanding exhaust gas. In some examples, turbine 116 may be configured as a variable geometry turbine (VGT). Fresh air with an ambient air pressure Pamb is introduced through an inlet (or intake) system 60 along intake passage 42 and through air filter 112 before flowing to compressor 114. The direction of flow is shown by arrow 11. Compressor 114 may be any suitable intake air compressor, such as a motor-driven or driveshaft-driven supercharger compressor. In engine system 100, the compressor is a turbocharger compressor driven by turbine 116. A wastegate actuator 92 may be actuated open to relieve at least some exhaust pressure from upstream of turbine 116 to a location downstream of the turbine via a wastegate 90. By reducing exhaust pressure upstream of the turbine, turbine speed may be reduced, which in turn reduces compressor speed and a resulting boost pressure.

From compressor 114, compressed air charge flows through a charge-air cooler (CAC) 17 and a throttle valve 20 to an intake manifold 22 of engine 10. In some examples, intake manifold 22 may include an intake manifold pressure sensor 124 for estimating a manifold pressure (MAP) and/or an intake air flow sensor 122 for estimating a mass air flow (MAF) in the intake manifold 22. In other examples, MAF sensor 122 may be omitted, as described herein. For example, charge air mass flow may be determined using a speed-density model, as described further with respect to FIG. 2, and a fresh air mass flow may be determined based on a determined EGR mass flow and the determined charge air mass flow, as also shown schematically with respect to FIGS. 3 and 4. In another example, fresh air mass flow may be estimated based on a predicted EGR rate (which may be determined from EGR valve position and the gas composition of the intake) and compressor operating parameters (e.g., pressure ratio and speed), and this estimated mass flow may be used with exhaust and EGR system dynamics to calculate EGR flow and ultimately correct the predicted EGR rate, as described further with respect to FIG. 6.

Intake manifold 22 is coupled to a series of combustion chambers (e.g., cylinders) 30 through a series of intake valves (not shown). The combustion chambers 30 are further coupled to an exhaust manifold 36 via a series of exhaust valves (not shown). For example, each combustion chamber 30 may include one or more intake valves for receiving an air charge from intake manifold 22 and one or more exhaust valves for expelling combustion reaction products (e.g., exhaust gas) to exhaust manifold 36. In the depicted embodiment, a single exhaust manifold 36 is shown. However, in other embodiments, the exhaust manifold may include a plurality of exhaust manifold sections. Configurations having a plurality of exhaust manifold sections may enable effluent from different combustion chambers to be directed to different locations in the engine system.

In one embodiment, each of the exhaust and intake valves may be electronically actuated or controlled. In another embodiment, each of the exhaust and intake valves may be cam actuated or controlled. Whether electronically actuated or cam actuated, the timing of exhaust and intake valve opening and closure may be adjusted as needed for desired combustion and emissions-control performance.

Combustion chambers 30 may be supplied one or more fuels, such as gasoline, alcohol fuel blends, diesel, biodiesel, compressed natural gas, etc., via a fuel injector 66 (while only one fuel injector is shown in FIG. 1, each combustion chamber includes a fuel injector coupled thereto). Fuel may be delivered to fuel injector 66 by a fuel system (not shown), including a fuel tank, a fuel pump, and a fuel rail. Fuel may be supplied to the combustion chambers via direct injection, port injection, throttle valve-body injection, or any combination thereof. In the example of FIG. 1, fuel injector 66 is shown directly injecting fuel into combustion chambers 30. In the combustion chambers, combustion may be initiated via spark ignition and/or compression ignition.

As shown in FIG. 1, exhaust gas is directed from exhaust manifold 36 to turbine 116 to drive the turbine. The combined flow from turbine 116 and wastegate 90 then flows through an emission control device 170 positioned within an exhaust system (or exhaust tract) 61. In general, one or more emission control devices 170 may include one or more exhaust after-treatment catalysts configured to catalytically treat the exhaust gas and thereby reduce an amount of one or more substances in the exhaust gas. For example, one exhaust after-treatment catalyst may be configured to trap $NO_x$ from the exhaust gas when the exhaust gas is lean and to reduce the trapped $NO_x$ when the exhaust gas is rich. In other examples, an exhaust after-treatment catalyst may be configured to disproportionate $NO_x$ or to selectively reduce $NO_x$ with the aid of a reducing agent. In still other examples, an exhaust after-treatment catalyst may be configured to oxidize residual hydrocarbons and/or carbon monoxide in the exhaust flow. Different exhaust after-treatment catalysts having any such functionality may be arranged in wash coats or elsewhere in the exhaust after-treatment stages, either separately or together. In some embodiments, the exhaust after-treatment stages may include a regeneratable soot filter configured to trap and oxidize soot particles in the exhaust gas. All or part of the treated exhaust gas from emission control device 170 may flow in the direction of an arrow 21 and be released into the atmosphere via an exhaust passage 102 after passing through a muffler 172. In exhaust passage 102, the exhaust gas has a pressure PMufFun at a position upstream of muffler 172 and downstream of emission control device 170.

A part of the exhaust gas from exhaust passage 102 may be recirculated to inlet system 60 via an external exhaust gas recirculation (EGR) system 140. In the example of FIG. 1, EGR system 140 is a low-pressure exhaust gas recirculation (LP-EGR) delivery system. In other examples, EGR system 140 may be a high-pressure exhaust gas recirculation (HP-EGR) delivery system. In still other examples, both an LP-EGR delivery system and an HP-EGR delivery system may be included in EGR system 140.

As shown in FIG. 1, an EGR passage 180 may be fluidically coupled to exhaust passage 102 at a location downstream of emission control device 170. A portion of exhaust gas from exhaust passage 102 may be delivered from downstream of turbine 116 to inlet system 60 upstream of compressor 114 via EGR passage 180 and an EGR valve 52. The direction of flow of the exhaust gas in EGR passage 180 is shown by arrows 26. Upstream of compressor 114 and downstream of EGR valve 52, in intake passage 42, an air or gas mixture flowing into the compressor 114 is at the pressure PCompFun. An opening of the EGR valve 52 may be regulated to control the flow of exhaust gas from the exhaust passage 102 to the inlet system 60, thus changing the proportion of exhaust gas in the gas mixture. For example, a degree of opening of a valve flap 23 may be adjusted to allow a controlled amount of exhaust gas to flow through a valve opening 24 of EGR valve 52 and to compressor 114 for desirable combustion and emissions control performance. A position of valve flap 23, and thus a position of EGR valve 52, may be determined (e.g., measured) by an EGR valve position sensor 4, which may be included in a device 2 for predicting an EGR rate, as described further below. Further, an EGR cooler 184 may be coupled to EGR passage 180 to cool the exhaust gas before being delivered to inlet system 60.

A gas composition sensor 3 may also be included in device 2. In one example, gas composition sensor 3 is an oxygen sensor. For example, gas composition sensor 3 may be an oxygen sensor configured as an FMan sensor in order to determine a burnt mass fraction of gas in inlet system 60. Gas composition sensor 3 may be arranged upstream of compressor 114 and downstream of EGR valve 52, as shown in FIG. 1, but alternatively, gas composition sensor 3 may be arranged between the compressor 114 and combustion chambers 30 of engine 10.

Device 2 may further comprise an evaluation apparatus 5 configured to receive signals from gas composition sensor 3 with information about the composition of the gas in inlet system 60, receive signals from EGR valve position sensor 4 with information about the position or setting of the EGR valve, evaluate the received signals, and determine and output a value of the EGR rate. Furthermore, the evaluation apparatus may be configured to output feedback signals for regulating the position of the EGR valve, as described further below with respect to FIG. 2.

Additional sensors, such as temperature, pressure, and/or humidity sensors, may be coupled to EGR passage 180 for providing further details regarding the composition and condition of the EGR. Alternatively, EGR conditions may be inferred by one or more of a temperature sensor 55, a pressure sensor 56, and a humidity sensor 57 coupled to intake passage 42 upstream of compressor 114. Temperature sensor 55, pressure sensor 56, and humidity sensor 57 may also be used to provide details concerning the composition and condition of fresh intake air entering intake manifold 22, for example. An amount of EGR routed through EGR system 140 may be requested to attain a desired engine dilution, thereby improving fuel efficiency and emissions quality, as described further with respect to FIG. 2. The amount of EGR requested may be based on engine operating conditions including engine load, engine speed, engine temperature, etc.

Engine system 100 may further include a control system 14. Control system 14 may include a controller 12. For example, controller 12 may be a microcomputer comprising a microprocessor unit, input/output ports, an electronic storage medium for executable programs and calibration values (such as a read-only memory chip), random access memory, keep alive memory, and a data bus. Controller 12 is shown receiving information from a plurality of sensors 16 (various examples of which are described herein) and sending control signals to a plurality of actuators 18 (various examples of which are described herein). As one example, sensors 16 may include MAP sensor 124, MAF sensor 122, an exhaust temperature sensor 128, an exhaust pressure sensor 129, an exhaust gas oxygen sensor 126, gas composition sensor 3, EGR valve position sensor 4, inlet temperature sensor 55, inlet pressure sensor 56, inlet humidity sensor 57, a crankshaft sensor, a pedal position sensor, and an engine coolant temperature sensor. Other sensors such as additional pressure, temperature, air/fuel ratio, and composition sensors may be coupled to various locations in engine system 100. The actuators 18 may include, for example, throttle 20, EGR valve 52, wastegate valve 92, and fuel injector 66. Controller 12 may receive input data from the various sensors, process the input data, and trigger various actuators in response to the processed input data based on instruction or code programmed therein corresponding to one or more routines. Controller 12 may also send signals to and receive signals from evaluation apparatus 5 of device 2 regarding the EGR flow rate, an EGR mass flow, a charge air mass flow, a fresh air mass flow, etc. In one example, evaluation apparatus 5 is a dedicated microcomputer included in control system 14 for determining the EGR flow rate and related parameters (EGR mass flow, etc.). For example, controller 12 may use the information generated by evaluation apparatus 5 to adjust the position of EGR valve 52, determine the EGR mass flow, and/or determine the mass flow of fresh air flowing through air filter 112, as described further below. In another example, evaluation apparatus 5 may determine the EGR mass flow and/or the fresh air mass flow.

Figure 2:
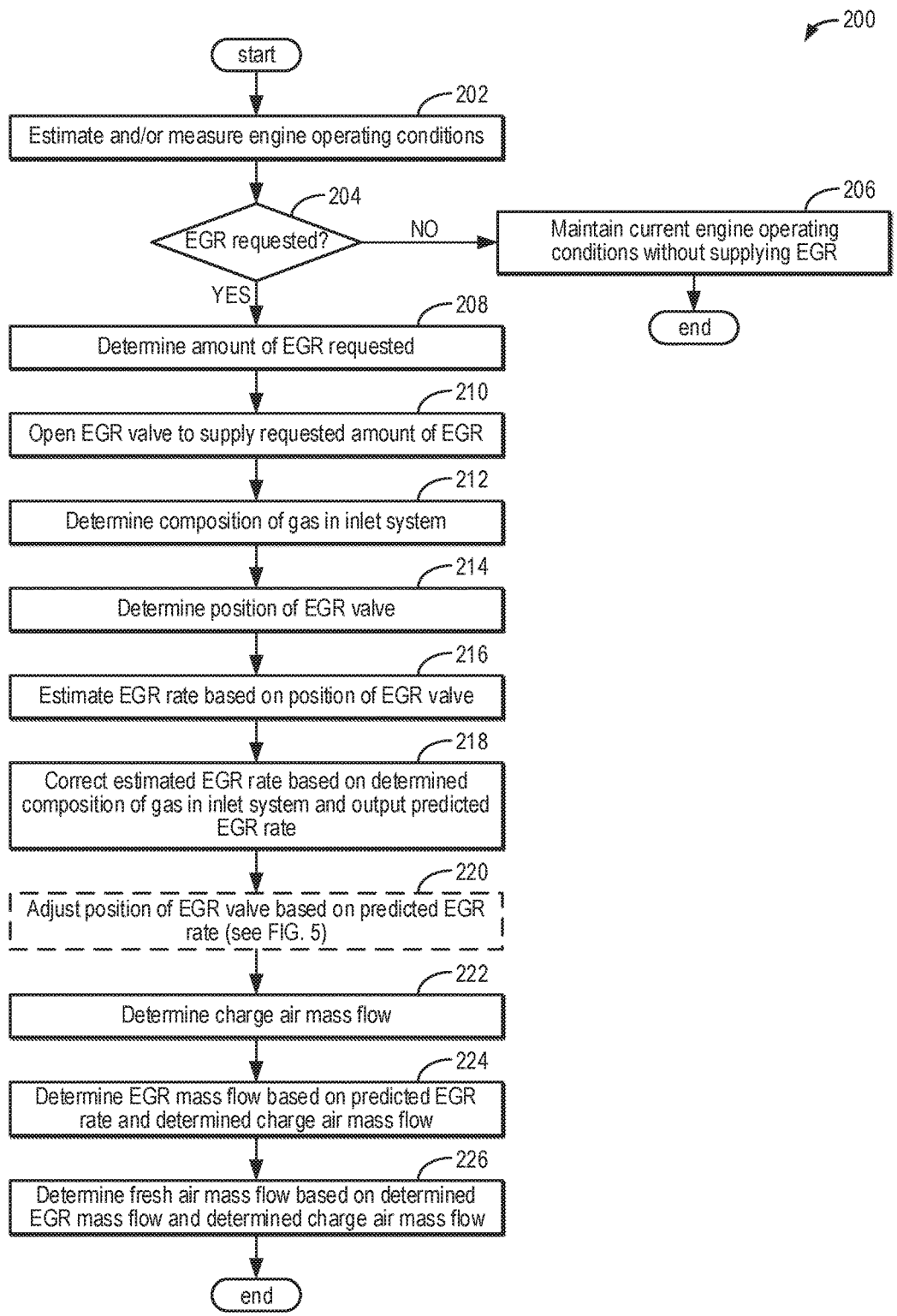
FIG. 2 is a flow chart of an example method for predicting the EGR rate using the device according to the present disclosure and for further determining an EGR mass flow and a fresh air mass flow entering the internal combustion engine.

FIG. 2 shows a flow chart of an example method 200 for predicting an EGR rate. For example, the EGR rate may be predicted using a device (e.g., device 2 of FIG. 1) comprising an EGR valve position sensor (e.g., EGR valve position sensor 4 of FIG. 1), a gas composition sensor (e.g., gas composition sensor 3 of FIG. 1), and an evaluation apparatus (e.g., evaluation apparatus 5 of FIG. 1). The device for predicting the EGR rate may be positioned in an inlet system of an internal combustion engine downstream of a junction where recirculated exhaust gases are introduced into the inlet system. Instructions for carrying out method 200 and the rest of the methods included herein may be executed by a controller, such as controller 12 of FIG. 1, based on instructions stored on a memory of the controller and in conjunction with signals received from sensors of the engine system, such as the sensors described above with reference to FIG. 1. The controller may employ engine actuators of the engine system to adjust engine operation according to the methods described below. Further, aspects of method 200 may be executed by the evaluation apparatus, which may be communicatively coupled to the controller, based on instructions stored on a memory of the evaluation apparatus and/or the controller.

Method 200 begins at 202 and includes estimating and/or measuring engine operating conditions. Conditions assessed may include, for example, engine temperature, engine load, driver torque demand, boost demand, manifold air flow, manifold air pressure, engine speed, throttle position, exhaust pressure, exhaust air/fuel ratio, ambient conditions (e.g., ambient temperature, pressure, and humidity), etc.

At 204, it is determined if EGR is requested. For example, EGR may be desired after the exhaust catalyst has attained its light-off temperature. Furthermore, EGR may be requested to attain a desired engine dilution, thereby improving fuel efficiency and emissions quality.

If EGR is not requested, method 200 proceeds to 206 and includes maintaining current engine operating conditions without supplying EGR. Thus, the flow rate of EGR need not be determined because no EGR is requested. However, the controller may confirm that an EGR valve (e.g., EGR valve 52 of FIG. 1) is in a closed position, thereby preventing EGR flow, using the EGR valve position sensor. Following 206, method 200 ends.

If EGR is requested, method 200 proceeds to 208 and includes determining an amount of EGR requested. The amount of EGR requested may be based on engine operating conditions, including engine load, engine speed, engine temperature, etc. For example, the controller may refer a look-up table having the engine speed and load as the input and a signal corresponding to a degree of opening to apply to the EGR valve as the output, the degree of opening providing a dilution amount corresponding to the input engine speed-load. In still other examples, the controller may rely on a model that correlates a change in engine load with a change in the dilution requirement of the engine and further correlates the change in the dilution requirement of the engine with a change in an EGR requirement. For example, as engine load increases from a low load to a mid-load, the EGR requirement may increase and a larger EGR valve opening may be requested. Then, as engine load increases from a mid-load to a high load, the EGR requirement may decrease and a smaller EGR valve opening may be requested. The controller may further determine the amount of EGR requested by taking into account a best fuel economy mapping for a desired dilution rate.

At 210, method 200 includes opening the EGR valve to supply the requested amount of EGR. For example, the EGR valve may be adjusted to a position corresponding to a desired dilution amount, with the degree of EGR valve opening increased as the amount of EGR requested increases, as described above. In another example, the position of the EGR valve may be adjusted responsive to a change in the dilution requirement, as also described above.

At 212, method 200 includes determining a composition of gas in the inlet system. The composition of the gas, such as a proportion of combusted gas (e.g., FMan), may be determined using output of the gas composition sensor. For example, the gas composition sensor may be an oxygen sensor.

At 214, method 200 includes determining the position of the EGR valve (e.g., an actual position of the EGR valve). The position of the EGR valve may be measured by the EGR valve position sensor, and the position of the EGR valve may be determined by the evaluation apparatus based on the output of the EGR valve position sensor. For example, if the EGR valve includes a valve flap (e.g., valve flap 23 of FIG. 1), the position of the valve flap may be determined, with the position of the valve flap corresponding to a degree of opening or setting of the EGR valve.

At 216, method 200 includes estimating the EGR rate based on the position of the EGR valve. For example, the evaluation apparatus may refer a look-up table having the determined position of the EGR valve (e.g., as determined at 214) as the input and an estimated EGR rate as the output. In another example, the evaluation apparatus may refer a model that correlates the position of the EGR valve with an estimated EGR rate.

At 218, method 200 includes correcting the estimated EGR rate based on the determined composition of the gas in the inlet system and outputting a predicted EGR rate. In one example, particularly if the engine is operating under lean fueling conditions, recirculated exhaust gas may contain a significant portion of oxygen, making the estimated EGR rate, based on the position of the EGR valve (e.g., as determined at 214), inaccurate in terms of an actual engine dilution achieved through EGR. Thus, a more accurate EGR rate may be predicted by taking into account the composition of the gas (e.g., as determined at 212), which includes the recirculated exhaust gas and fresh air. The evaluation apparatus may refer a look-up table with the determined composition of the gas and the position of the EGR valve as inputs and the corrected, predicted EGR rate as the output. The evaluation apparatus may output the predicted EGR rate to the controller, for example.

At 220, method 200 optionally includes adjusting the position of the EGR valve based on the predicted EGR rate. For example, if the predicted EGR rate is not equal to (e.g., is a threshold amount different from) the requested EGR rate (e.g., as determined at 208), the controller may increase (if the predicted EGR rate is lower than the requested EGR rate) or decrease (if the EGR rate is greater than the requested EGR rate) the degree of opening of the EGR valve, as described further with respect to FIG. 5.

At 222, method 200 includes determining a charge air mass flow. In one example, the charge air mass flow may be measured by a mass air flow sensor positioned in an intake manifold of the engine (e.g., MAF sensor 122 of FIG. 1). In another example, the charge air mass flow may be determined using a speed-density model based on output of a manifold pressure sensor (e.g., MAP sensor 124 of FIG. 1) in combination with other engine operating parameters, such as engine speed, intake air temperature, and throttle position.

At 224, method 200 includes determining an EGR mass flow based on the predicted EGR flow rate and the determined charge air mass flow. For example, the controller may refer a look-up table with the predicted EGR rate and determined charge air mass flow as the inputs and output the EGR mass flow.

At 226, method 200 includes determining a fresh air mass flow based on the determined EGR mass flow and the determined charge air mass flow. As the charge air includes the recirculated exhaust gas and fresh air that flows through an air filter (e.g., air filter 112 of FIG. 1) of the inlet system, the fresh air mass flow may be determined by subtracting the EGR mass flow from the charge air mass flow, as described further below with respect to FIGS. 3 and 4. Following 226, method 200 ends.

Thus, method 200 provides a method for accurately predicting an EGR rate without using a mass air flow sensor. Further, the predicted EGR flow rate may be used in combination with a charge air mass flow to determine both an EGR mass flow and a fresh air mass flow. Further still, the predicted EGR flow rate may optionally be used as feedback for adjusting a position of an EGR valve in order to achieve a desired EGR flow rate, as described further with respect to FIG. 5.

Figure 3:
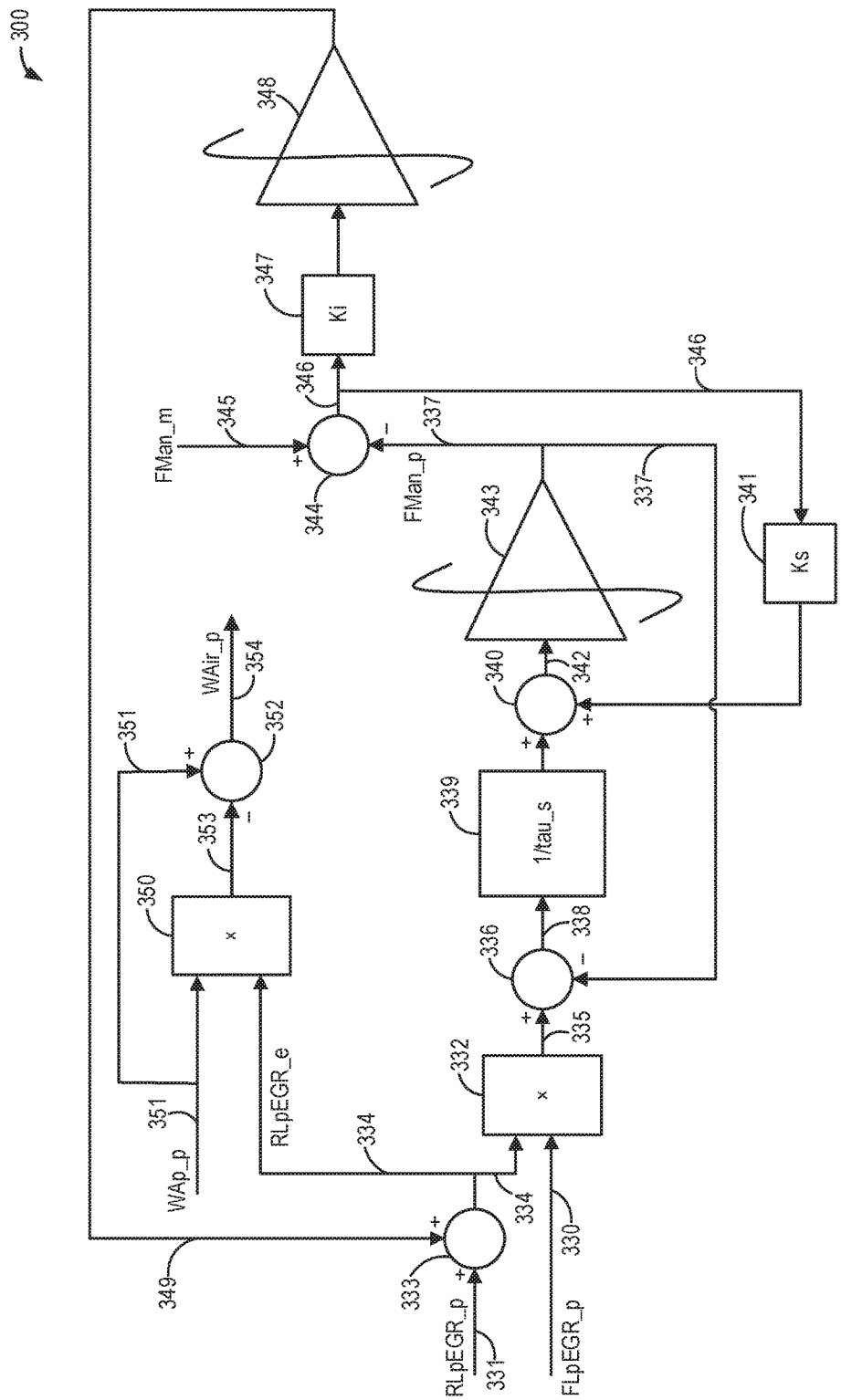
FIG. 3 is a schematic view of an embodiment variant of a signal processing method for determining the fresh air mass flow into the internal combustion engine.
Figure 4:
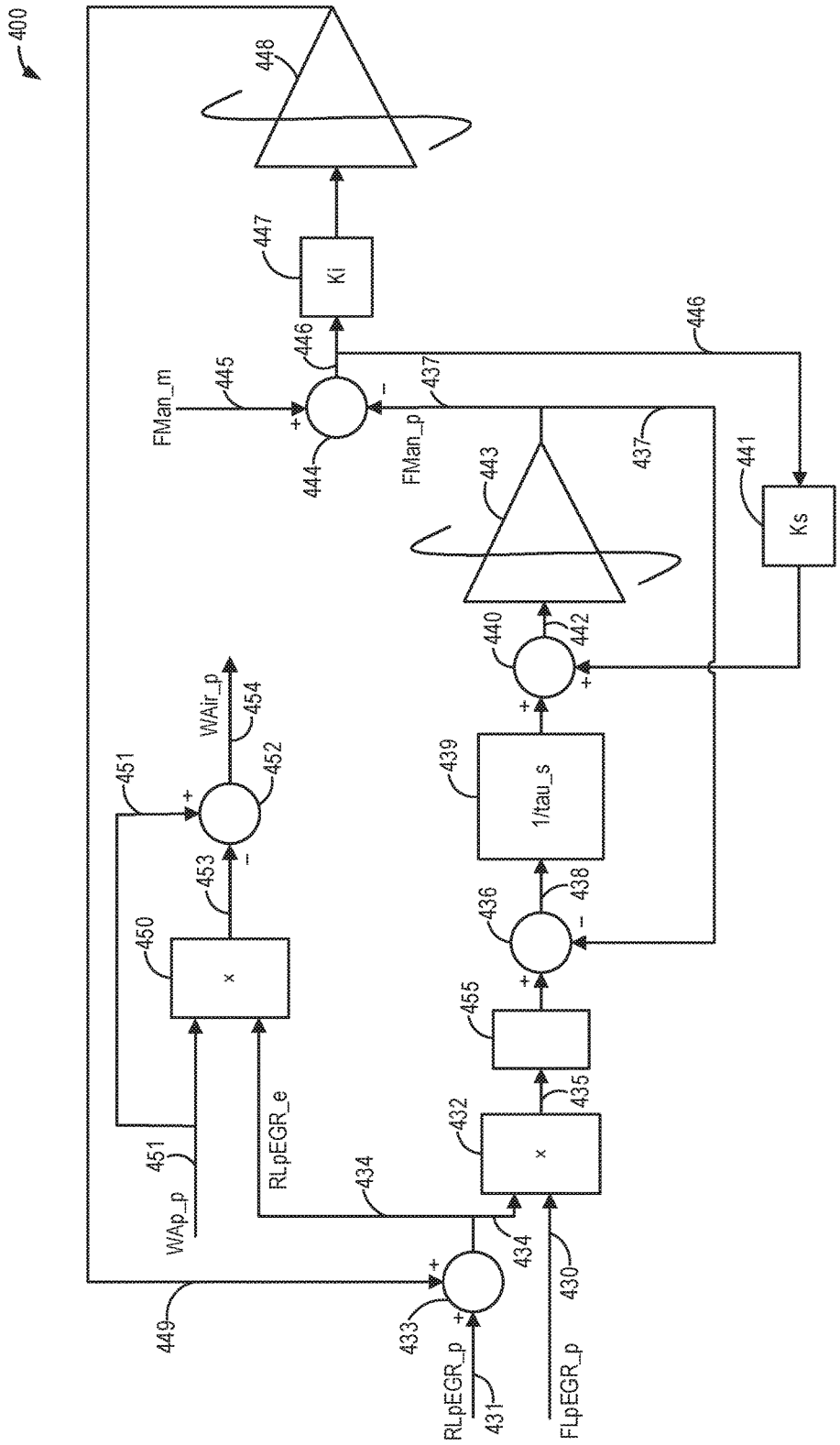
FIG. 4 is a schematic view of a further embodiment variant of a signal processing method for determining the fresh air mass flow into the internal combustion engine.

FIGS. 3 and 4 show embodiment variants of a signal processing schematic, with inputs processed to output a predicted fresh air mass flow (abbreviated WAir_p) flowing through an air filter of an inlet system of an internal combustion engine. For example, the functions diagrammed in FIGS. 3 and 4 may be performed as a part of method 200 of FIG. 2. In one example, the functions are performed by a controller, such as controller 12 of FIG. 1. In another example, the functions are performed by an evaluation apparatus included in a device for determining an EGR flow rate (e.g., evaluation apparatus 5 of device 2 of FIG. 1) that is communicatively coupled to the controller. For example, both the controller and the evaluation apparatus may be included in a control system of the engine. Like elements of FIGS. 3 and 4 are numbered similarly and not reintroduced (e.g., 330 of FIG. 3 corresponds to 430 of FIG. 4).

At arrow 330, a predicted burnt mass fraction level of the EGR ("FLpEGR_p") is made available (for example, based on output of an exhaust gas oxygen sensor, such as exhaust gas oxygen sensor 126 of FIG. 1). At arrow 331, a predicted exhaust gas recirculation rate ("RLpEGR_p") is made available (such as according to method 200 of FIG. 2). The predicted exhaust gas recirculation rate was generated, for example, on the basis of an EGR valve position as determined by an EGR valve position sensor (e.g., EGR valve position sensor 4 of FIG. 1).

The signal 331 is standardized by means of a summing junction or an adder element 333 and converted into a signal 334. The signal 334 corresponds to a standardized estimated exhaust gas recirculation rate. The signal 334, that is to say the standardized estimated exhaust gas recirculation rate ("RLpEGR_e"), and the signal 330, the predicted burnt mass fraction level of the EGR, are converted by means of a multiplier 332 into a signal 335, which is fed to an adder element 336.

Within the scope of the adder element 336, a signal 337, corresponding to a predicted burnt mass fraction in an intake manifold of the engine ("FMan_p"), is subtracted from the signal 335. A resulting signal 338 is filtered by a delay element or a filter 1/tau_s 339 and fed to an adder element 340. The adder element 340 adds the filtered signal 338 to a tuning parameter Ks that is generated by a tuning device 341, as described further below.

Subsequently, the generated signal 342 is amplified proportionally by an amplifier 343, which, if appropriate, comprises a sampler, and converts said generated signal 342 into the signal 337, which is fed to the adder element 336, as mentioned above. The signal 337 is also input to a further adder element 344, which subtracts the signal 337 from a measured burnt mass fraction ("FMan_m") 345 in the intake manifold. The signal 345 may be generated based on an output of a gas composition sensor positioned in the engine inlet (e.g., gas composition sensor 3 of FIG. 1), for example.

A resulting signal 346 generated by adder element 344 is fed to the tuning device 341 that generates the tuning parameter Ks as well as to an amplifier 348, which can comprise a sampler, after setting or tuning with a tuning parameter Ki at a tuning device 347.

A signal 349 generated by the amplifier 348 is made available to the adder element 333 for addition to the signal 331. The signal 334, generated by the adder element 333 as described above, is fed to the multiplier 332 as well as to a multiplier 350. Within the scope of the multiplier 350, said signal 334 is multiplied by a predicted mass flow ("WAp_p") 351 entering the internal combustion engine. The predicted mass flow may be generated using a speed-density model, as described with respect to FIG. 2. This signal 351 is also fed to an adder element 352. In addition, a signal 353, which is generated by the multiplier 350, is fed to the adder element 352, wherein the signal 353 is subtracted from the signal 351. The resulting signal 354 is the predicted fresh air mass flow, that is to say, the mass flow through the air filter ("WAir_p"). Thus, the fresh air mass flow may be determined without use of a dedicated air flow sensor based on the predicted EGR rate.

In contrast to the embodiment variant in FIG. 3, in the embodiment variant shown in FIG. 4, a step 455 is inserted between the multiplier 432 and the summing junction or the adder element 436. At step 455, the signal 435 that is generated by the multiplier 432 is modeled to take into account mixture dynamics and/or transportation delays before being fed into adder element 436.

Figure 5:
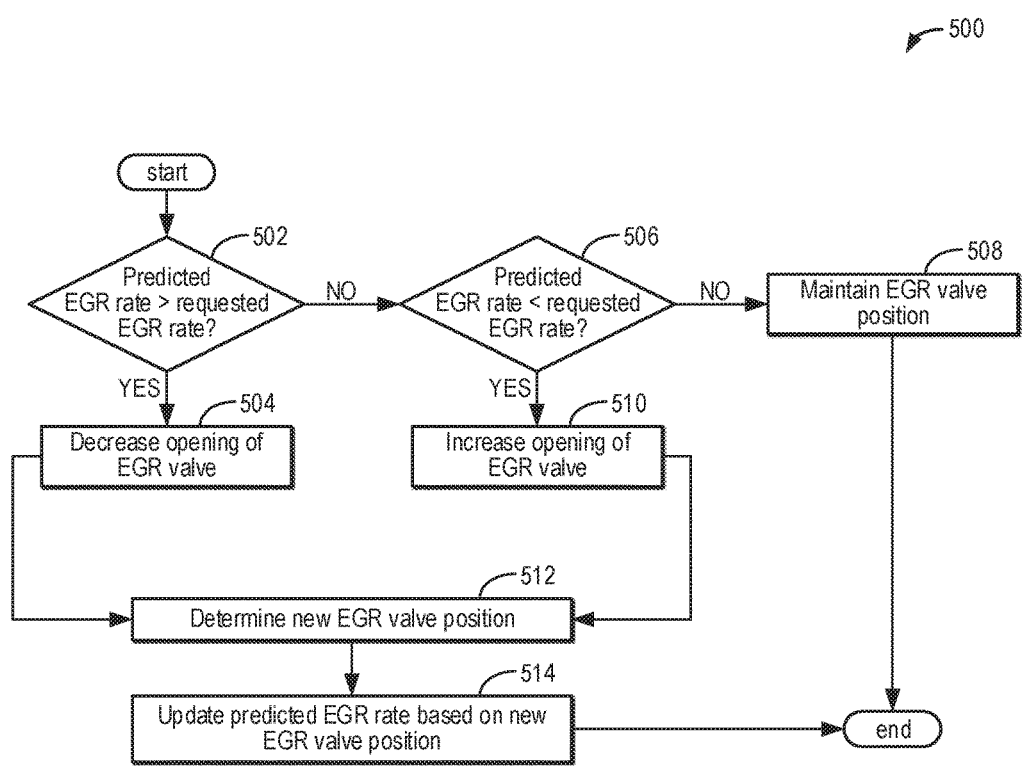
FIG. 5 is a flow chart of an example method for adjusting a position of the EGR valve based on the predicted EGR rate.

Turning now to FIG. 5, a method 500 for using a device for predicting an EGR rate (e.g., device 2 of FIG. 1) to help control a position of an EGR valve (e.g., EGR valve 52 of FIG. 1) is shown. For example, method 500 may be performed as part of method 200 of FIG. 2 (e.g., at 220) in order to accurately control an amount of EGR entering an inlet system of an internal combustion engine.

Method 500 begins at 502 and includes determining if a predicted EGR rate (e.g., from 218 of FIG. 2) is greater than a requested EGR rate (e.g., from 208 of FIG. 2). For example, the predicted EGR rate may be determined to be greater than the requested EGR rate if the predicted EGR rate is at least a threshold amount greater than the requested EGR rate.

If the predicted EGR rate is greater than the requested EGR rate, method 500 proceeds to 504 and includes decreasing an opening of the EGR valve. For example, the controller may refer a look-up table having a difference between the requested EGR rate and the predicted EGR rate as the input and a signal corresponding to a new, decreased degree of opening to apply to the EGR valve as the output. In still other examples, the controller may rely on a model that correlates the difference between the requested EGR rate and the predicted EGR rate with a change in the EGR valve position and further correlates the change in the EGR valve position with a signal to apply to the EGR valve. Method 500 then proceeds to 512, as will be described below.

If, at 502, the predicted EGR rate is not greater than the requested EGR rate, method 500 proceeds to 506 and includes determining if the predicted EGR rate is less than the requested EGR rate. For example, the predicted EGR rate may be determined to be less than the requested EGR rate if the predicted EGR rate is at least the threshold amount less than the requested EGR rate.

If the predicted EGR rate is not less than the requested EGR rate, method 500 proceeds to 508 and includes maintaining the EGR valve position. As the predicted EGR rate is effectively equal to the requested EGR rate, no EGR valve position adjustments are needed to provide a desired engine dilution. Following 508, method 500 ends.

If, at 506, the predicted EGR rate is less than the requested EGR rate, method 500 proceeds to 504 and includes increasing the opening of the EGR valve. For example, the controller may refer a look-up table having a difference between the requested EGR rate and the predicted EGR rate as the input and a signal corresponding to a new, increased degree of opening to apply to the EGR valve as the output. In still other examples, the controller may rely on a model that correlates the difference between the requested EGR rate and the predicted EGR rate with a change in the EGR valve position and further correlates the change in the EGR valve position with a signal to apply to the EGR valve to further open the EGR valve.

At 512, method 500 includes determining the new EGR valve position. For example, the EGR valve position may be determined using an EGR valve position sensor (e.g., EGR valve position sensor 5 of FIG. 1) included in the device for predicting the EGR rate, as described further with respect to FIG. 2 (e.g., at 214).

At 514, method 500 includes updating the predicted EGR rate based on the new EGR valve position. The updated predicted EGR rate may be determined by an evaluation apparatus (e.g., evaluation apparatus 5 of FIG. 1) included in the device for predicting the EGR rate. For example, the evaluation apparatus may update an estimated EGR rate based on the new EGR valve position and correct the estimated EGR rate based on a composition of gas in the inlet system (e.g., as measured by a gas composition sensor included in the device for predicting the EGR rate), as described further with respect to FIG. 2. Following 514, method 500 ends.

In this way, a fresh air mass flow of an internal combustion engine may be determined without use of a dedicated air flow sensor based on a predicted EGR rate, as determined using a device for predicting the EGR rate. The predicted EGR rate may be a corrected estimate of the EGR rate, wherein the EGR rate is estimated based on a position of an EGR valve that restricts EGR flow into an inlet of the engine and the correction is made based on a measured composition of gas in the inlet. In particular, the EGR rate may be predicted with higher accuracy compared to air flow sensor-based methods. For example, the predicted EGR rate will not be influenced by factors such as air flow sensor drift and aging. Further, the position of the EGR valve may be adjusted based on the predicted EGR rate in order to accurately provide a requested engine dilution.

Figure 6:
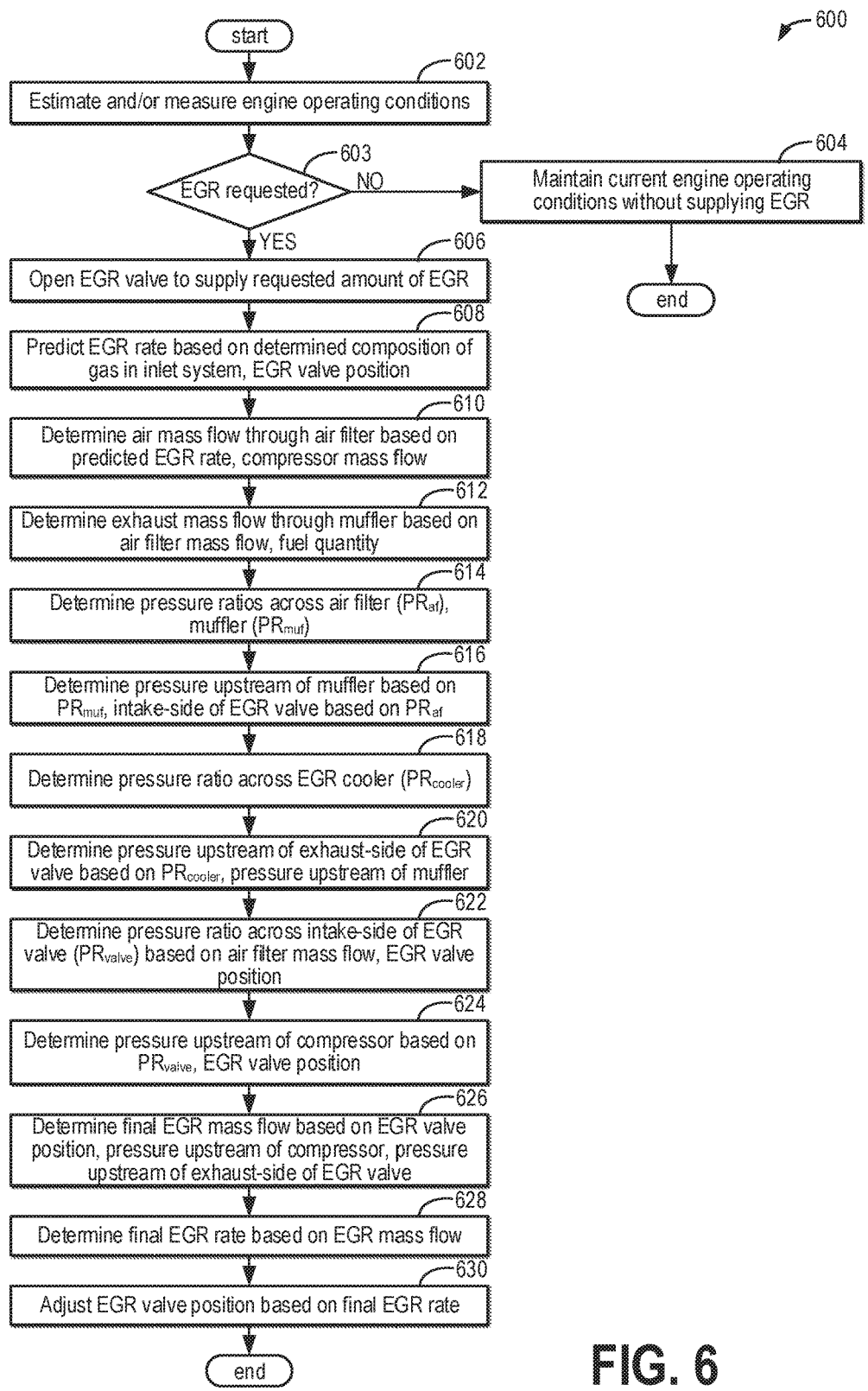
FIG. 6 is a flow chart of an example method for determining an EGR rate without input from an intake mass flow sensor.

Turning to FIG. 6, a method 600 for calculating an EGR mass flow and EGR rate in order to control EGR valve position, without the use of an intake air flow sensor, is presented. For example, the EGR rate may be predicted using a device (e.g., device 2 of FIG. 1) comprising an EGR valve position sensor (e.g., EGR valve position sensor 4 of FIG. 1), a gas composition sensor (e.g., gas composition sensor 3 of FIG. 1), and an evaluation apparatus (e.g., evaluation apparatus 5 of FIG. 1). The device for predicting the EGR rate may be positioned in an inlet system of an internal combustion engine downstream of a junction where recirculated exhaust gases are introduced into the inlet system. Instructions for carrying out method 600 may be executed by a controller, such as controller 12 of FIG. 1, based on instructions stored on a memory of the controller and in conjunction with signals received from sensors of the engine system, such as the sensors described above with reference to FIG. 1. The controller may employ engine actuators of the engine system to adjust engine operation according to the methods described below. Further, aspects of method 600 may be executed by the evaluation apparatus, which may be communicatively coupled to the controller, based on instructions stored on a memory of the evaluation apparatus and/or the controller.

Method 600 begins at 602 and includes estimating and/or measuring engine operating conditions. Conditions assessed may include, for example, engine temperature, engine load, driver torque demand, boost demand, manifold air flow, manifold air pressure, engine speed, throttle position, exhaust pressure, exhaust air/fuel ratio, ambient conditions (e.g., ambient temperature, pressure, and humidity), etc.

At 603, it is determined if EGR is requested. For example, EGR may be desired after the exhaust catalyst has attained its light-off temperature. Furthermore, EGR may be requested to attain a desired engine dilution, thereby improving fuel efficiency and emissions quality.

If EGR is not requested, method 600 proceeds to 604 and includes maintaining current engine operating conditions without supplying EGR. Thus, the flow rate of EGR need not be determined because no EGR is requested. However, the controller may confirm that an EGR valve (e.g., EGR valve 52 of FIG. 1) is in a closed position, thereby preventing EGR flow, using the EGR valve position sensor. Following 604, method 600 ends.

If EGR is requested, method 600 proceeds to 606 to open an EGR valve to supply a requested amount of EGR. The amount of EGR requested may be based on engine operating conditions, including engine load, engine speed, engine temperature, etc. For example, the controller may refer a look-up table having the engine speed and load as the input and a signal corresponding to a degree of opening to apply to the EGR valve as the output, the degree of opening providing a dilution amount corresponding to the input engine speed-load. In still other examples, the controller may rely on a model that correlates a change in engine load with a change in the dilution requirement of the engine and further correlates the change in the dilution requirement of the engine with a change in an EGR requirement. For example, as engine load increases from a low load to a mid-load, the EGR requirement may increase and a larger EGR valve opening may be requested. Then, as engine load increases from a mid-load to a high load, the EGR requirement may decrease and a smaller EGR valve opening may be requested. The controller may further determine the amount of EGR requested by taking into account a best fuel economy mapping for a desired dilution rate. The EGR valve may be adjusted to a position corresponding to a desired dilution amount, with the degree of EGR valve opening increased as the amount of EGR requested increases, as described above. In another example, the position of the EGR valve may be adjusted responsive to a change in the dilution requirement, as also described above.

At 608, method 600 includes predicting an EGR rate based on a position of the EGR valve and a determined composition of gas in the inlet system. The composition of the gas, such as a proportion of combusted gas (e.g., FMan), may be determined using output of the gas composition sensor. For example, the gas composition sensor may be an oxygen sensor. The position of the EGR valve may be measured by the EGR valve position sensor, and the position of the EGR valve may be determined by the evaluation apparatus based on the output of the EGR valve position sensor. For example, if the EGR valve includes a valve flap (e.g., valve flap 23 of FIG. 1), the position of the valve flap may be determined, with the position of the valve flap corresponding to a degree of opening or setting of the EGR valve.

To estimate the EGR rate, the evaluation apparatus may refer a look-up table having the determined position of the EGR valve (e.g., as determined above) as the input and an estimated EGR rate as the output. In another example, the evaluation apparatus may refer a model that correlates the position of the EGR valve with an estimated EGR rate. This estimated EGR rate may then be corrected based on the determined composition of the gas in the inlet system. In one example, particularly if the engine is operating under lean fueling conditions, recirculated exhaust gas may contain a significant portion of oxygen, making the estimated EGR rate, based on the position of the EGR valve (e.g., as determined above), inaccurate in terms of an actual engine dilution achieved through EGR. Thus, a more accurate EGR rate may be predicted by taking into account the composition of the gas (e.g., as determined above), which includes the recirculated exhaust gas and fresh air. The evaluation apparatus may refer a look-up table with the determined composition of the gas and the position of the EGR valve as inputs and the corrected, predicted EGR rate as the output. The evaluation apparatus may output the predicted EGR rate to the controller, for example.

At 610, method 600 includes determining air mass flow through an air filter (e.g., air filter 112 of FIG. 1) based on the predicted EGR rate (e.g., as predicted above at 608) and compressor mass flow. Compressor mass flow may be determined based on a sensed pressure ratio across the compressor and compressor speed, which may be measured or estimated (e.g., according to engine speed and load, exhaust gas mass flow, wastegate position, etc.). For example, the compressor pressure ratio may be sensed from output from an upstream pressure sensor (such as pressure sensor 56 of FIG. 1) and a downstream pressure sensor (such as MAP sensor 124 of FIG. 1), and the compressor pressure ratio may be input along with compressor speed to a compressor map stored in memory of the controller. The compressor map may output compressor mass flow. In an example, the air mass flow may be determined by subtracting the predicted EGR rate from one (e.g., in order to determine the fraction of the flow through the intake comprised of fresh air) and then multiplying by the compressor mass flow.

At 612, method 600 includes determining exhaust mass flow through a muffler (e.g., muffler 172 of FIG. 1) based on the air filter mass flow (e.g., determined at 610) and a fuel quantity supplied to the engine. In an example, the fuel quantity may be a fuel mass flow to the engine and the muffler exhaust mass flow may be determined by multiplying the fuel mass flow by the air filter mass flow.

At 614, method 600 determines respective pressure ratios across the air filter (PRaf) and muffler (PRmuf). The pressure ratio across the air filter may be a function of a corrected mass flow through the air filter, e.g., the air filter mass flow determined above corrected for temperature and pressure. For example, the corrected air filter mass flow may be entered as an input to a look-up table that returns the pressure ratio across the air filter (e.g., based on known geometry of the air filter). Likewise, the pressure ratio across the muffler may be a function of a corrected mass flow through the muffler, e.g., the muffler mass flow determined above corrected for temperature and pressure. For example, the corrected muffler mass flow may be entered as an input to a look-up table that returns the pressure ratio across the muffler (e.g., based on known geometry of the muffler).

At 616, method 600 includes determining a pressure upstream of the muffler (PMufFun) based on PRmuf and determining a pressure upstream of the intake-side of the EGR valve (PComboAir) based on PRaf. PMufFun may be calculated by multiplying PRmuf by ambient pressure and PComboAir may be calculated by multiplying PRaf by ambient pressure. Ambient pressure may be determined from output from a pressure sensor positioned to measure ambient pressure (e.g., outside the engine) or it may be determined from GPS, weather, or data.

At 618, method 600 includes determining a pressure ratio across an EGR cooler (PRcooler), such as EGR cooler 184 of FIG. 1. The PRcooler may be calculated as a function of a corrected EGR mass flow (e.g., corrected for temperature and pressure). The EGR mass flow may be a previously-calculated EGR mass flow or the EGR mass flow may be estimated based on the predicted EGR rate. For example, the corrected EGR mass flow may be entered as an input to a look-up table that returns the pressure ratio across the EGR cooler (e.g., based on known geometry of the EGR cooler).

At 620, method 600 includes determining a pressure upstream of an exhaust-side of the EGR valve (PComboEGR) based on PRcooler and the pressure upstream of the muffler (PMufFun). The PComboEGR may be calculated by multiplying the PRcooler by PMufFun.

At 622, method 600 determines the pressure ratio across the intake-side of the EGR valve (PRvalve) based on air filter mass flow and EGR valve position. As explained earlier, the EGR valve may be a combo valve that includes a flap that, when open, creates a first orifice through which EGR may flow and a second orifice through which intake air may flow. The EGR valve position may thus be defined as the orifice diameter for the first, EGR orifice and the orifice diameter for the second, intake orifice. The pressure ratio across the intake-side of the EGR valve may be calculated as a function of the corrected mass flow through the air filter and the effective open area of the intake-side of the EGR valve (e.g., the orifice diameter of the second orifice). For example, the corrected air filter mass flow and effective open area of the intake-side of the EGR valve may be entered as inputs to a look-up table that returns the pressure ratio across the intake-side of the EGR valve as an output.

At 624, the pressure upstream of the compressor PCompFun (e.g., between the EGR valve and the compressor) is determined based on PRvalve and the EGR valve position. For example, the PCompFun may be determined by multiplying the PRvalve by the effective open area of the intake-side of the EGR valve (e.g., the orifice diameter of the second orifice).

At 626, a second (final) EGR mass flow is determined based on EGR valve position (specifically, the effective open area of the EGR side of the EGR valve, also referred to as the orifice diameter of the first orifice), pressure upstream of the compressor, and the pressure upstream of the exhaust-side of the EGR valve (e.g., the pressure ratio across the exhaust-side of the EGR valve). For example, the final EGR mass flow may be output from a look-up table that utilizes the exhaust side effective open area and exhaust-side EGR valve pressure ratio as inputs.

At 628, the final EGR rate is determined based on the final EGR mass flow, for example the final EGR mass flow may be calculated by dividing the final EGR mass flow by the final EGR mass flow plus the air filter mass flow. In this way, the final EGR rate may represent the fraction of air entering the engine that comprises EGR. At 630, the EGR valve position may optionally be adjusted based on the final EGR rate. For example, if the final EGR rate is different than the predicted EGR rate, the EGR valve position may be adjusted so that the actual EGR rate reaches the final EGR rate. In an example, a difference or error between the predicted and final EGR rates may be calculated and this error may be used by the controller to determine an updated EGR valve position. If the final EGR rate is the same or within a threshold range (e.g., 5%) of the predicted EGR rate, then the EGR valve position may not be adjusted. In a still further example, if the predicted EGR rate and final EGR rate differ by more than the threshold, the predicted EGR rate may be updated to match the final EGR rate, and then the final EGR rate may be recalculated. Once the predicted and final EGR rates match, the final EGR rate may be used to adjust EGR valve position.

Thus, according to the embodiments disclosed herein, a gas composition sensor such as the FMan sensor placed in the engine's intake system and a position reading for the low pressure EGR valve(s) may be used with a model (e.g., physical phenomological) based description of deriving the pressure levels and mass flows in the intake and exhaust systems.

By solving the model online with e.g. limited step optimization algorithm, the fresh air mass through the air filter may be predicted. This leads to a prediction of the low pressure EGR rate. Multiplying the predicted low pressure EGR rate with the burnt fraction in the exhaust leads to a prediction of the burnt mass fraction upstream of the gas composition sensor. By utilizing the model for the sensor dynamics as well feeding the error between the model of the sensor output and the actual measurement, a dynamic correction for the low pressure rate may be found. Based on this corrected low pressure EGR rate, the fresh air flow to the engine may be determined/estimated without the usage of a dedicated air flow sensor such as a hot film sensor or hot wire sensor, thus lowering the cost of the vehicle. The technical effect of using a device comprising an EGR valve position sensor, a gas composition sensor, and an evaluation apparatus for predicting an EGR rate is that the EGR rate may be more accurately regulated, resulting in reduced $NO_x$ emissions.

As one example, a system is provided, comprising an inlet system coupled to an internal combustion engine; an exhaust gas recirculation (EGR) valve coupled between an exhaust of the engine and the inlet system; and a device to predict an EGR rate based on a composition of gas in the inlet system and a position of the EGR valve. In the preceding example, additionally or optionally, the prediction of the EGR rate is based on a correction of an estimate of the EGR rate, wherein the estimate is based on the position of the EGR valve and the correction is based on the composition of the gas in the inlet system, as determined using a sensor arranged in the inlet system. In any or all of the preceding examples, additionally or optionally, the EGR valve is configured as a low-pressure EGR valve. In any or all of the preceding examples, additionally or optionally, the sensor comprises an oxygen sensor. In any or all of the preceding examples, additionally or optionally, the device to predict the EGR rate is further configured to predict an EGR mass flow and predict a fresh air mass flow of an air filter arranged upstream of the EGR valve in the inlet system.

As another example, a method is provided, comprising determining a composition of gas in an inlet system of an internal combustion engine; determining a position of an exhaust gas recirculation valve coupled between an exhaust of the engine and the inlet system; estimating an exhaust gas recirculation rate based on the determined position of the exhaust gas recirculation valve; and predicting an exhaust gas recirculation rate by correcting the estimate of the exhaust gas recirculation rate based on the determined composition of the gas in the inlet system of the internal combustion engine. In the preceding example, additionally or optionally, the composition of the gas in the inlet system is determined using an oxygen sensor. In any or all of the preceding examples, additionally or optionally, the exhaust gas recirculation valve is a low-pressure exhaust gas recirculation valve. In any or all of the preceding examples, additionally or optionally, the position of the exhaust gas recirculation valve is determined by measuring the position of the exhaust gas recirculation valve with an exhaust gas recirculation valve sensor. In any or all of the preceding examples, the method additionally or optionally further comprises adjusting the position of the exhaust gas recirculation valve if the predicted exhaust gas recirculation rate is at least a threshold amount different from a requested exhaust gas recirculation rate. In any or all of the preceding examples, the method additionally or optionally further comprises predicting an exhaust gas recirculation mass flow based on the predicted exhaust gas recirculation rate. In any or all of the preceding examples, additionally or optionally, the predicted exhaust gas recirculation mass flow is determined by multiplying the predicted exhaust gas recirculation rate by a charge air mass flow that enters the internal combustion engine through inlet valves coupled to each cylinder of the internal combustion engine. In any or all of the preceding examples, additionally or optionally, the charge air mass flow is determined based on signals from engine sensors, including at least one of engine speed, manifold absolute pressure, intake temperature, and intake mass air flow. In any or all of the preceding examples, the method additionally or optionally further comprises predicting a fresh air mass flow through an air filter arranged upstream of the exhaust gas recirculation valve based on the predicted exhaust gas recirculation mass flow and the charge air mass flow.

As another example, a system for a vehicle is provided, comprising an internal combustion engine, including a plurality of cylinders, coupled to an inlet system and an exhaust system; an air filter coupled to the inlet system; a turbocharger comprising a turbine arranged in the exhaust system and a compressor arranged in the inlet system; a low-pressure exhaust gas recirculation (EGR) system for recirculating exhaust from downstream of the turbine in the exhaust system to upstream of the compressor and downstream of the air filter in the inlet system via an EGR passage; an EGR valve coupled to the EGR passage, configured to restrict or enable EGR flow; a device for predicting an EGR flow rate comprising a gas composition sensor, an EGR valve position sensor, and an evaluation apparatus; an intake temperature sensor and an absolute pressure sensor coupled to the inlet system; an engine speed sensor; and a control system holding one or more computer readable instructions stored on one or more non-transitory memories that, when executed, cause the control system to: determine a requested EGR rate based on engine speed and load; open the EGR valve to a position corresponding to the requested EGR rate; determine an actual position of the EGR valve; determine an estimated EGR rate based on the actual position of the EGR valve; determine a composition of gas in the inlet system downstream of the EGR valve; and determine a predicted EGR rate as a correction of the estimated EGR rate based on the composition of gas in the inlet system downstream of the EGR valve. In the preceding example, additionally or optionally, the gas composition sensor is an oxygen sensor. In any or all of the preceding examples, additionally or optionally, the control system holds further instructions that, when executed, cause the control system to: further open the EGR valve responsive to the predicted EGR rate being less than a threshold amount below the requested EGR rate; further close the EGR valve responsive to the predicted EGR rate being greater than the threshold amount above the requested EGR rate. In any or all of the preceding examples, additionally or optionally, the control system holds further instructions that, when executed, cause the control system to: determine a mass flow of charge air entering the internal combustion engine, wherein the charge air is comprised of fresh air introduced through the air filter and recirculated exhaust introduced through the EGR passage; determine an EGR mass flow; and determine a fresh air mass flow. In any or all of the preceding examples, additionally or optionally, the EGR mass flow is determined by multiplying the predicted EGR rate by the mass flow of the charge air. In any or all of the preceding examples, additionally or optionally, the fresh air mass flow is determined by subtracting the EGR mass flow from the mass flow of the charge air.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system comprising:
an inlet system coupled to an internal combustion engine;
an exhaust gas recirculation (EGR) valve coupled between an exhaust of the engine and the inlet system; and
a device comprising a microcomputer, where the device predicts an EGR rate based on a composition of gas in the inlet system and a position of the EGR valve, the composition of the gas and the position of the EGR valve based on sensor output received at the device, wherein the EGR rate is predicted by determining an estimated EGR rate and correcting the estimated EGR rate, the estimated EGR rate determined based on the position of the EGR valve, and the estimated EGR rate corrected based on the composition of the gas; and
a controller communicatively coupled to the device, the controller comprising computer readable instructions stored on non-transitory memory that, when executed, cause the controller to:
receive the predicted EGR rate from the device; and
adjust the position of the EGR valve responsive to the predicted EGR rate differing from a desired EGR rate.

2. The system as claimed in claim 1, wherein the sensor output is determined at least in part by a sensor arranged in the inlet system.

3. The system as claimed in claim 1, wherein the EGR valve is configured as a low-pressure EGR valve.

4. The system as claimed in claim 2, wherein the sensor comprises an oxygen sensor.

5. The system as claimed in claim 1, wherein the device to predict the EGR rate is further configured to predict an EGR mass flow and predict a fresh air mass flow of an air filter arranged upstream of the EGR valve in the inlet system based on the sensor output.

6. A method, comprising:
determining a composition of gas in an inlet system of an internal combustion engine;
determining a position of an exhaust gas recirculation valve coupled between an exhaust of the engine and the inlet system;
estimating an exhaust gas recirculation rate based on the determined position of the exhaust gas recirculation valve; and
predicting an exhaust gas recirculation rate by correcting the estimate of the exhaust gas recirculation rate based on the determined composition of the gas in the inlet system of the internal combustion engine, and adjusting the position of the exhaust gas recirculation valve responsive to the predicted exhaust gas recirculation rate differing from a requested exhaust gas recirculation rate.

7. The method as claimed in claim 6, wherein the composition of the gas in the inlet system is determined using an oxygen sensor.

8. The method as claimed in claim 6, wherein the exhaust gas recirculation valve is a low-pressure exhaust gas recirculation valve.

9. The method as claimed claim 6, wherein the position of the exhaust gas recirculation valve is determined by measuring the position of the exhaust gas recirculation valve with an exhaust gas recirculation valve sensor.

10. The method as claimed in claim 6, further comprising:
predicting an exhaust gas recirculation mass flow based on the predicted exhaust gas recirculation rate.

11. The method as claimed in claim 10, wherein the predicted exhaust gas recirculation mass flow is determined by multiplying the predicted exhaust gas recirculation rate by a charge air mass flow that enters the internal combustion engine through inlet valves coupled to each cylinder of the internal combustion engine.

12. The method as claimed in claim 11, wherein the charge air mass flow is determined based on signals from engine sensors, including at least one of engine speed, manifold absolute pressure, intake temperature, and intake mass air flow.

13. The method as claimed in claim 11, further comprising:
predicting a fresh air mass flow through an air filter arranged upstream of the exhaust gas recirculation valve based on the predicted exhaust gas recirculation mass flow and the charge air mass flow.

14. A system for a vehicle, comprising:
an internal combustion engine, including a plurality of cylinders, coupled to an inlet system and an exhaust system;
an air filter coupled to the inlet system;
a turbocharger comprising a turbine arranged in the exhaust system and a compressor arranged in the inlet system;
a low-pressure exhaust gas recirculation (EGR) system for recirculating exhaust from downstream of the turbine in the exhaust system to upstream of the compressor and downstream of the air filter in the inlet system via an EGR passage;
an EGR valve coupled to the EGR passage, configured to restrict or enable EGR flow;
a device for predicting an EGR flow rate comprising a gas composition sensor, an EGR valve position sensor, and an evaluation apparatus, where the evaluation apparatus is a microcomputer;
an intake temperature sensor and an absolute pressure sensor coupled to the inlet system;
an engine speed sensor; and
a control system holding one or more computer readable instructions stored on one or more non-transitory memories that, when executed, cause the control system to:
determine a requested EGR rate based on engine speed and load;
open the EGR valve to a position corresponding to the requested EGR rate;
determine an actual position of the EGR valve;
determine an estimated EGR rate based on the actual position of the EGR valve;
determine a composition of gas in the inlet system downstream of the EGR valve;
correct the estimated EGR rate based on the composition of gas in the inlet system downstream of the EGR valve;
determine a predicted EGR rate as the correction of the estimated EGR rate based on the composition of gas in the inlet system downstream of the EGR valve; and
adjust the position of the EGR valve responsive to a difference between the predicted EGR rate and the requested EGR rate.

15. The system of claim 14, wherein the gas composition sensor is an oxygen sensor.

16. The system of claim 14, wherein adjusting the position of the EGR valve responsive to the difference between the predicted EGR rate and the requested EGR rate includes:
   opening the EGR valve responsive to the predicted EGR rate being less than a threshold amount below the requested EGR rate; and
   closing the EGR valve responsive to the predicted EGR rate being greater than the threshold amount above the requested EGR rate.

17. The system of claim 14, wherein the control system holds further instructions that, when executed, cause the control system to:
   determine a mass flow of charge air entering the internal combustion engine, wherein the charge air is comprised of fresh air introduced through the air filter and recirculated exhaust introduced through the EGR passage;
   determine an EGR mass flow; and
   determine a fresh air mass flow.

18. The system of claim 17, wherein the EGR mass flow is determined by multiplying the predicted EGR rate by the mass flow of the charge air.

19. The system of claim 17, wherein the fresh air mass flow is determined by subtracting the EGR mass flow from the mass flow of the charge air.

* * * * *